(12) United States Patent
Åström et al.

(10) Patent No.: US 9,179,338 B2
(45) Date of Patent: Nov. 3, 2015

(54) RESILIENCE OPERATION OF A DATA LAYERED ARCHITECTURE

(71) Applicant: Telefonaktiebolaget L M Ericsson (publ), Stockholm (SE)

(72) Inventors: Bo Åström, Stockholm (SE); Jan Lemark, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 29 days.

(21) Appl. No.: 14/186,509

(22) Filed: Feb. 21, 2014

(65) Prior Publication Data

US 2014/0242953 A1    Aug. 28, 2014

Related U.S. Application Data

(60) Provisional application No. 61/772,035, filed on Mar. 4, 2013.

(30) Foreign Application Priority Data

Feb. 22, 2013  (EP) .................................... 13156436

(51) Int. Cl.
*H04L 12/58*  (2006.01)
*H04W 24/04*  (2009.01)
*H04L 12/707* (2013.01)
*H04W 4/12*   (2009.01)
*H04W 40/24*  (2009.01)

(52) U.S. Cl.
CPC ............... *H04W 24/04* (2013.01); *H04L 45/22* (2013.01); *H04W 4/12* (2013.01); *H04W 40/246* (2013.01)

(58) Field of Classification Search
USPC ........................................................ 455/412.1
See application file for complete search history.

(56) References Cited

U.S. PATENT DOCUMENTS 8,458,350 B2 *  6/2013  Kenst et al. .................... 709/230
2006/0089965 A1  4/2006  Fontes et al.
2012/0191754 A1  7/2012  Torralba et al.

FOREIGN PATENT DOCUMENTS

EP   2083532 A1    7/2009
WO   2012041404 A1 4/2012

OTHER PUBLICATIONS

European Search Report dated Aug. 6, 2013, in related application EP 13 15 6436, 8 pages.

* cited by examiner

*Primary Examiner* — Joel Ajayi
(74) *Attorney, Agent, or Firm* — Rothwell, Figg, Ernst & Manbeck, P.C.

(57) ABSTRACT

Various techniques for routing a request message, which requests a service requiring a data operation on data which is stored in a data backend system, are discussed. The request message is received by a first application front end entity of an application layer. Based on the received request message, a data operation message is sent from the first application front end entity to a first data repository of the data backend system. The first data repository returns routing information to the first application front end entity, which enables the first application front end entity to route the request message to a second application front end entity of the application layer. The second application front end entity communicates with a given data repository which stores the data.

15 Claims, 12 Drawing Sheets

RESILIENCE OPERATION OF A DATA LAYERED ARCHITECTURE

CROSS-REFERENCE TO RELATED APPLICATIONS

This application claims the benefit of U.S. provisional application No. 61/772,035, filed on 2013 Mar. 4, which is incorporated by reference; this application also claims priority to EP application number 13156436.1 filed on 2013 Feb. 22, which is incorporated by reference.

TECHNICAL FIELD

Various embodiments of the invention relate to a method of providing routing information for routing of a request message, wherein the request message requests a data operation; and to a method of routing the request message; and to a method of executing the data operation requested by the request message. Various embodiments further relate to an application front end entity of an application layer and to a data repository of a data backend. In particular, various embodiments relate to techniques which allow to operate a data layered architecture comprising the application layer and the data backend system during failure conditions where the data backend system becomes at least partly unavailable.

BACKGROUND

Scenarios are known where a layered architecture is provided which allows for a separation of data storage from application logic in a communication network, in which the data is stored in a data backend system while application logic operating on such data resides on application front end entities of an application layer. Such layered architectures are referred to as Data Layered Architecture (DLA) hereinafter.

A reference implementation of such a DLA is the User Data Convergence (UDC) scenario of the Third Generation Partnership Project (3GPP) mobile communications network standard, Technical Specification (TS) 23.335 Version 11.0.0 available as of 28. Sep. 2012 and TS 22.101 Version 12.3.0 available as of 18. Dec. 2012. The UDC allows to store subscriber-specific data employing a data backend system operation from application logic in an application layer.

Using a DLA typically allows to provide a highly available and location-redundant data storage to the application front end entities; this may in turn simplify the design of applications executed on the application front end entities. Furthermore, the DLA typically simplifies the routing in a core network of the communication network. Any requesting node may be served by any application front end entity—independently of a particular data storage location.

Yet, reference implementations of the DLA may face certain restrictions and drawbacks. For example, a situation may occur where the data backend system and/or a connecting status becomes unavailable to a smaller or larger degree (failure condition). In such a failure condition, disturbances may occur in the communication network where data stored in the data backend system is not available or available only to a limited degree. Calls may fail, data communication may be disturbed, and services, e.g. a short message service (SMS), may be degraded.

Therefore, a need exists for a resilience mode of operation for a Data Layered Architecture, comprising a data backend system and an application layer, which allows to handle failure conditions where the data backend system becomes at least partly unavailable.

SUMMARY

This need is met by the features of the independent claims. The dependent claims define embodiments.

According to an aspect, a method of providing routing information for routing of a request message in a communication network is provided. The request message requests a service requiring a data operation on data, wherein the data is stored on a plurality of data repositories. The data repositories are configured for communicating via a communication protocol, thereby constituting a data backend system of the communication network. A plurality of application front end entities of an application layer of the communication network can access the data backend system. Each one of the plurality of application front end entities is configured for communicating with a respective given repository. The method comprises a first data repository of the plurality of data repositories receiving, from a first application front end entity of the application layer, a request for routing information for the request message towards a storage location of the data or receiving a data operation message created by the first application front end entity based on the request message. The method further comprises, in response to said receiving of the request for routing information or of the data operation message, retrieving routing information towards a second application front end entity of the application layer. The second application front end entity communicates with a given data repository, wherein the storage location of the data is at least on the given data repository. The method further comprises the first data repositories sending the routing information to the first application front end entity with the routing information being such that the first application front end entity is enable to route the request message to the second application front end entity using a communication protocol of the application layer.

According to a further aspect, a data repository of a plurality of data repositories that are configured for communicating via a communication protocol, thereby constituting a data backend system of a communication network, is provided. A plurality of application front end entities of an application layer of the communication network can access the data backend system. Each one of the plurality of application front end entities is configured for communicating with a respective given data repository. The data repository comprises a first interface which is configured for receiving, from a first application front end entity of the application layer, a request for routing information for a request message towards a storage location of data or a data operation message being created by the first application front end entity based on the request message. The request message requests a service requiring a data operation on the data. The data repository further comprises a processor which is configured for retrieving, in response to said receiving of the request for routing information or of the data operation message, routing information towards the second application front end entity of the application layer which communicates with a given data repository. The storage location of the data is at least on the given data repository. The first interface is further configured for sending the routing information to the first application front end entity with the routing information being such that the first application front end entity is enabled to route the request message to the second application front end entity based on the routing information and using a communication protocol of the application layer.

According to a further aspect, a method of routing a request message in a communication network is provided. The request message requests a data operation on data. The data is stored on a plurality of data repositories configured for communicating via a communication protocol and thereby constituting a data backend system of the communication network. A plurality of application front end entities of an application layer of the communication network can access the data backend system. Each one of the plurality of application front end entities is configured for communicating with a respective given data repository. The method comprises a first application front end entity of the application layer receiving the request message and in response to said receiving of the request message, the first application front end entity retrieving, from a storage location database of the data backend system, routing information towards a second application front end entity of the application layer. The second application front end entity of the application layer communicates with a given data repository, wherein a storage location of the data is at least on the given data repository. The method further comprises the first application front end entity routing the request message to the second application front end entity based on the routing information and using a communication protocol of the application layer.

According to a further aspect, an application front end entity of a plurality of application front end entities of an application layer of a communication network is provided. Data is stored on a plurality of data repositories configured for communicating via a communication protocol thereby constituting a data backend system of the communication network. The plurality of application front end entities can access the data backend system. Each one of the plurality of application front end entities is configured for communicating with a respective given data repository. The application front end entity comprises a first interface configured for receiving a request message requesting a service requiring a data operation on the data. The application front end entity further comprises a second interface configured for, in response to said receiving of the request message, retrieving, from a storage location database of the data backend system, routing information towards a second application front end entity of the application layer. The second application front end entity of the application layer communicates with a given data repository, wherein a storage location of the data is at least on the given data repository. The application front end entity is further configured for routing the request message to the second application front end entity using a communication protocol of the application layer.

According to a further aspect, a method of executing a data operation on data in response to receiving a request message in a communication network is provided. The request message requests a service requiring the data operation. The data is stored on a plurality of data repositories configured for communicating via a communication protocol, thereby constituting a data backend system of the communication network. A plurality of application front end entities of an application layer of the communication network can access the data backend system. Each one of the plurality of application front end entities is configured for communicating with a respective given repository. The method comprises a second application front end entity of the application layer receiving the request message from the first application front end entity of the application layer. A cached copy of the data is stored on the second application front end entity. In response to said receiving of the request message, the second application front end entity executes the data operation on the cached copy of the data.

According to a further aspect, an application front end entity of a plurality of application front end entities of an application layer of a communication network is provided. Data is stored on a plurality of data repositories configured for communicating via a communication protocol, thereby constituting a data backend system of a communication network. The plurality of application front end entities can access the data backend system. Each one of the plurality of application front end entities is configured for communicating with a respective given data repository. The application front end entity comprises an interface configured for receiving a request message from a first application front end entity of the application layer. The request message requests a service requiring a data operation on the data. A cached copy of the data is stored in the application front end entity. The application front end entity further comprises a processor configured for, in response to said receiving of the request message, executing the data operation of the data on the cached copy of the data.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

The foregoing and additional features and effects of the invention will become apparent from the following detailed description when read in conjunction with the accompanying drawings, in which like reference numerals refer to like elements.

DETAILED DESCRIPTION

Figure 1:
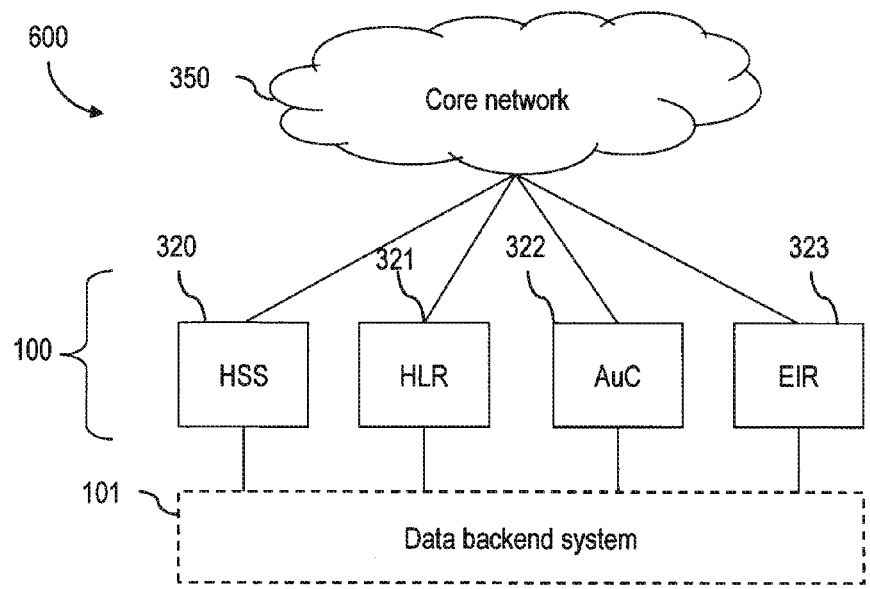
FIG. 1 is a schematic illustration of a Data Layered Architecture comprising an application layer with various application front end entities and further comprising a data backend system in communication with the application layer.

In the following, various embodiments will be described in detail with reference to the accompanying drawings. The following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques and concepts are discussed which allow for efficient and reliable data operation for data which is stored on a plurality of data repositories of a communication network. The data repositories are configured for communicating via a communication protocol and thereby constitute a data backend system of the communication network. The data backend is accessed through an application layer of the communication network. The application layer is formed by a plurality of application front end entities. An application front end entity of the application layer is configured to communicate with an associated data repository of the data backend system. It may be possible that each application front end entity communicates with a respective given one of the plurality of data repositories, e.g., each application front end entity communicating with a single respective given one. It is also possible that an application front end entity communicates with a plurality of respective data repositories. It may be possible that those application front end entities and data repositories which communicate with each other are co-located at the same site. In general, it is also possible that the application front end entities of the application layer each communicate with all data repositories of the data backend system.

In general, the data repository/data repositories with which each application front end entity communicates may depend on the mode of operation in which the DLA is operated.

Such a system design as discussed above comprising an application layer and a data backend system may be referred to as a DLA. The DLA allows to separate execution of logic functionality occurring in the application layer from data storage in the data backend system.

In FIG. 1, a DLA is depicted for a mobile communications network 600 according to the 3GPP TSs. While hereinafter reference is predominantly made to a mobile communications network according to the 3GPP TSs, it should be understood that in general the DLA may find application in various other communication networks, including fixed line networks.

From FIG. 1 it can be seen that the mobile communications network 600 comprises a core network 350. The core network 350 communicates with various application front end entities 320, 321, 322, 323. The application front end entities 320, 321, 322, 323 form an application layer 100 of the mobile communications network 600. Each of the application front end entities 320, 321, 322, 323 can access a data backend system 101 of the mobile communications network 600. The data backend system 101 stores data, i.e. subscriber data or user data or any other data. The application layer 100 and the data backend system 101 form the DLA.

As can be seen from FIG. 1, by providing the DLA, the data stored on the data backend system 101 is separated from the application logic residing on the application front end entities 320, 321, 322, 323. The separation can be defined in functional terms and/or physical, e.g. by providing separate units. By employing the DLA, data stored in the data backend system 101 may be available to each one of the application front end entities 320, 321, 322, 323—for example regardless of the physical location and/or other connection properties of the application front end entities 320, 321, 322, 323. In other words, it may be expendable to associate each one of the application front end entities 320, 321, 322, 323 with a given set of data; rather, it may be possible that each one of the application front end entities 320, 321, 322, 323 serves any request for data operation on the data, irrespective of the particular type of requested data or storage location of requested data.

This may simplify the routing in the core network 350, because it may be expendable to route a request message requesting a service requiring a data operation on the data to a particular one of the application front end entities which would be associated with the particular requested data.

An example of a possible entity of the application layer 100 is the Home Location Register (HLR) 320 according to, e.g., the 3GPP TS 23.016; in a reference implementation, the HLR 320 handles information of various subscribers authorized to access the mobile communications network 600. For example, the HLR 320 may handle subscriber parameters of a subscriber using a User Equipment (UE). This may relate to such subscriber parameters associated with a subscriber identification unit, e.g. Subscriber Identity Module (SIM), Universal Subscriber Identity Module (USIM) or the like, and/or may relate to an associated current location, e.g. a particular Mobile-services Switching Center (MSC) and/or Visitor Location Register (VLR).

The application front end entity 321 is a Home Subscriber Server (HSS) according to, e.g., 3GPP TS 23.228 In a reference implementation, the HSS 321 is configured to handle subscriber data. For this purpose, the HSS 321 is associated with a particular subscriber or a particular service used by the subscriber. In other words, the HSS 321, in a reference implementation, is a uniquely defined location for handling data relating to a particular subscriber.

It is possible that the mobile communications network 600 comprises a plurality of HLRs 320 and/or HSSs 321. In particular in such a case there may be the association between a particular one of the application front end entities 320, 321 and a particular subscriber of the mobile communications network 600.

Yet, using the DLA it may not be necessary to provide such a unique association between a particular subscriber and the HLR 320 and/or HSS 321; this is because the subscriber data is stored in the data backend system 101 and thereby available to all application front end entities 320, 321, 322, 323 of the application layer 100.

A further example of a possible constituent of the application layer 100 is the Authentication Center (AuC) 322, e.g. according to the 3GPP TS 33.102. A further example of a possible constituent of the application layer 100 is the Equipment Identity Register (EIR) according to e.g. the 3GPP TS 23.002

In general the application front end entities 320, 321, 322, 323 can be designed to access the data remotely by accessing the data backend system and without storing the data permanently locally. They may therefore be defined as a functional entity or provisioning entity that can access the data stored in the data backend system 101.

As can be seen from the above, the type of the application front end entities 320, 321, 322, 323 is not particularly limited. Rather, in various embodiments various constituents of the application layer 100 may access the data backend system 101. In particular, the data backend system 101 may be designed to grant access regardless of the particular type of application front end entity requesting the access. For this, the data backend system may be configured to operate according to certain standards which facilitate access, modification, and maintenance of the data stored e.g. in a distributed manner on the data backend system. In the following, reference will be made primarily to the HLR 320 as an exemplary constituent of the application layer 100. Unless described otherwise, respective functionality explained with respect to the HLR 320 may also be implemented with respect to the various application front end entities 321, 322, 323.

Figure 2:
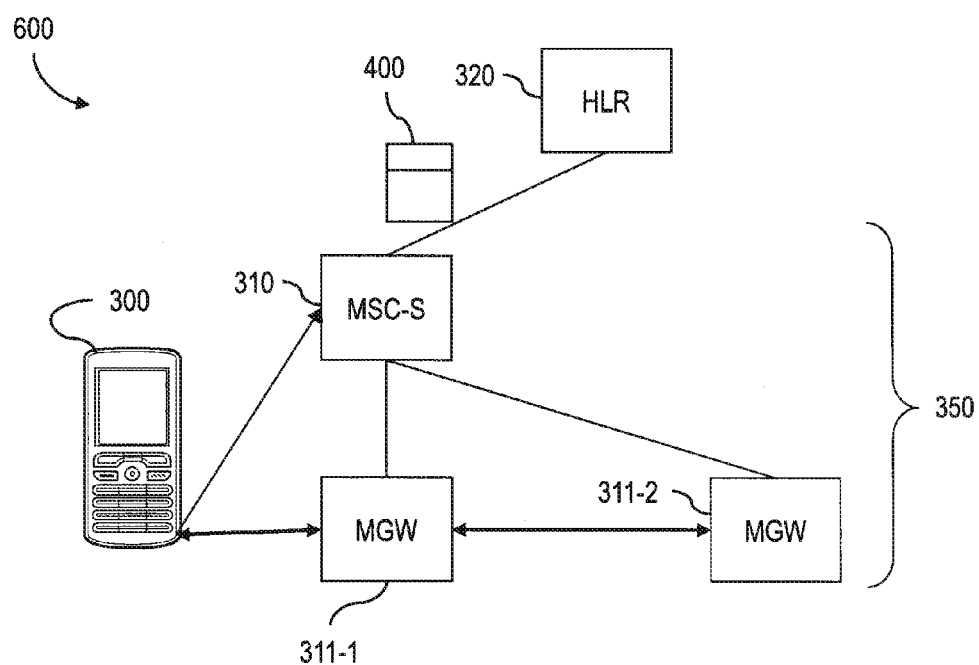
FIG. 2 is a schematic illustration of a mobile communications network according to the 3GPP standard where in particular a User Equipment and a Home Location Register are shown.

An exemplary and non-limiting situation where a data operation is requested through the HLR 320 is shown in FIG. 2. In FIG. 2, a UE 300 of a subscriber is connected to the core network 350. For example, this may be the case for 3GPP 2G and 3G networks where subscribers may access the core network 350 employing Global Systems for Mobile Communications (GSM) standards or employing a Wideband Code Division Multiplex (WCDMA) standards. Other examples of 2G/3G access technology are General Packet Radio Service (GPRS), Enhanced Data Rates for GSM Evolution (EDGE) or Enhanced GPRS (EGPRS), Universal Mobile Telecommunications System (UMTS), and High Speed Packet Access (HSPA). The situation exemplarily depicted in FIG. 2 may refer to a circuit switched (CS) access, while packet switched (PS) access is also possible, e.g., according to the 3GPP Long Term Evolution (LTE) standard. In latter case, connection may be established via the evolved Universal Mobile Telecommunications System Terrestrial Radio Access (E-UTRA) interface where a Mobility Management Entity (MME) takes control functions of a media connection between the UE 300 and a Serving Gateway (S-GW) (not shown in FIG. 2).

In FIG. 2, a media connection is established between the UE 300 and two Media Gateways (MGWs) 311-1, 311-2 according to 3GPP TS 23.205. For example, a CS voice connection may be established via the MGWs 311-1, 311-2. Furthermore, a signaling connection is established between the UE 300 and a Mobile Switching Center-Server (MSC-S) 310. The MSC-S 310 controls the MGWs 311-1, 311-2 and can further access the HLR 320. Thereby, the MSC-S 310 provides control of the CS media connection.

In various scenarios the MSC-S 310 may request a service which requires a data operation associated with the subscriber using the UE 300 from the HLR 320. In other words: the MSC-S 310 may request a HLR service by sending a request message. Therefore, the request message may implicitly or indirectly request the data operation.

An exemplary scenario may be a location change of the UE 300 or a change of the attachment status of the UE 300. The particular type of the HLR service is not limited. A typical example of an HLR service would be subscriber authorization. This service may require a data operation for retrieving the subscriber identification.

The request message is translated to a data operation by the logic within HLR. The data operation can refer to a read request and/or a write request. The data operation may therefore refer to a data invocation of the data. To request the data operation, the MSC-S 310 sends a request message 400 to the HLR 320. The request message 400 can be according to the signaling procedures of the Mobile Application Part (MAP) according to 3GPP TS 29.002.

Figure 3:
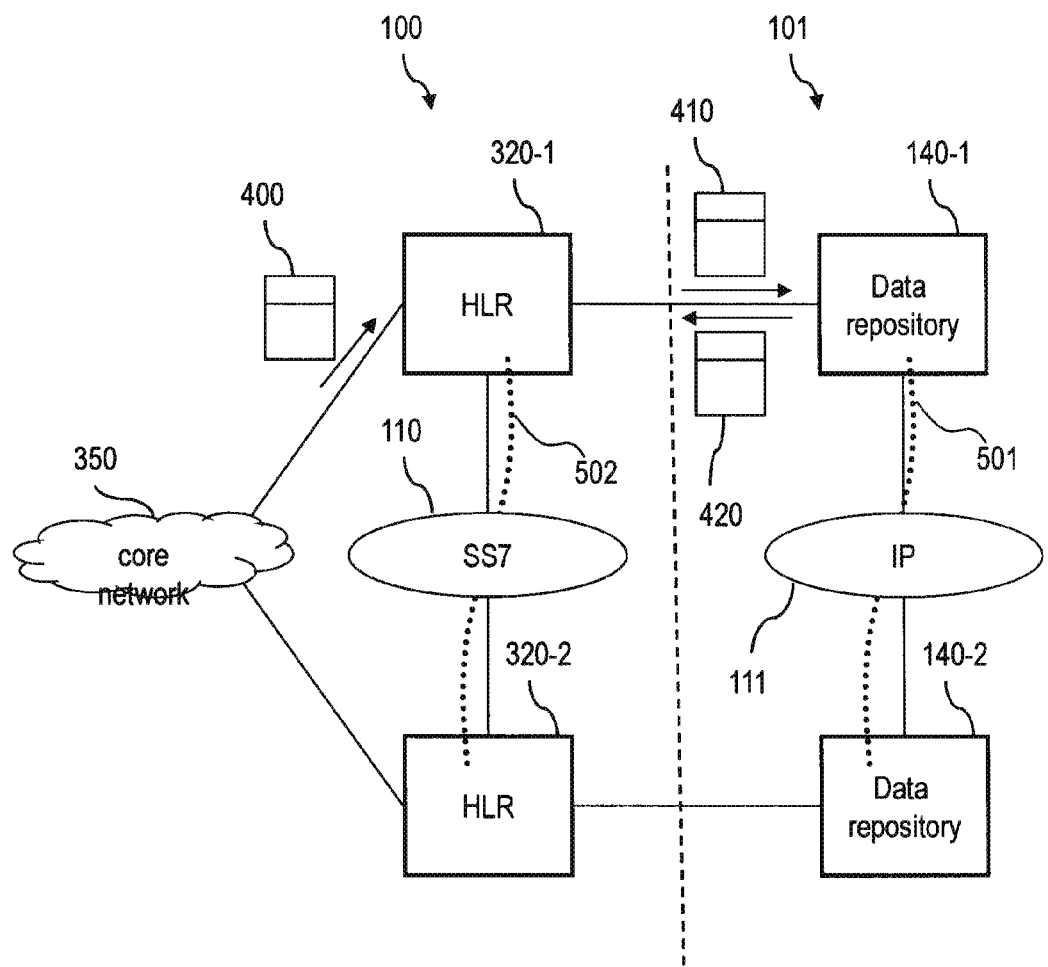
FIG. 3 schematically illustrates an implementation of the application layer and the data backend system.

Such a scenario of a data operation invocation triggered by the request message 400 is depicted in FIG. 3 for the application layer 100 and the data backend system 101.

In a reference implementation, the request message 400 triggers a service that generates a data operation invocation at the HLR 320-1. The HLR 320-1 can access the data backend system 101, because it is configured for communicating with a respective data repository 140-1 of the data backend system 101. For example, the HLR 320-1 and the data repository 140-1 can be co-located at the same site. In such a scenario, a low likelihood of communication failure between these two units 320-1, 140-1 may exist.

Accordingly, in response to the receiving of the request message 400, the HLR 320-1 creates a data operation message 410. For example, the data operation message 410 can comprise an identification of the subscriber of the UE 300 and a particular instruction for the data operation. For example, this identification could be the International Mobile Subscriber Identity (IMSI) and/or the Mobile Subscriber Integrated Services Digital Network Number (MSISDN).

For example, the data repository 140-1 may operate according to the Lightweight Directory Access Protocol (LDAP) according to the Request For Comments (RFC) 4510 and 4511 by the Internet Engineering Task Force (IETF). In latter case, the data operation message 410 may be formatted accordingly.

The data repository 140-1, upon receiving the data operation message 410 from the HLR 320-1, may access a storage location database (not shown in FIG. 3) to obtain routing information towards a storage location of the data in the data backend system 101.

Techniques may be applied to keep the storage location database updated, i.e., to provide the routing information such that it correctly, i.e., up-to-date, states the storage location of the data. The storage location may change over the course of time and/or due to various modes of operation; therefore, the method may comprise updating the storage location database, e.g., based on a new storage location.

The routing information may specify a routing address of a target node. Alternatively or additionally it may specify a routing path to the target node. The target node may reside in the application layer 100 or the data backend system 101. For example, the storage location of the data can be on a given data repository 140-2 which is connected to the data repository 140-1 through a communication protocol 111 of the data backend system 101. The obtained routing information may specify a routing path 501 towards the given data repository 140-2 which employs the communication protocol 111 of the data backend system 101. In other words: the data repository 140-1 proxies the data operation message 410 towards the data repository 140-2 which is the storage location of the respective data; this occurs by using the communication link of the data backend system 101. For example, the communication protocol 111 of the data backend system 101 may operate according to the Internet Protocol (IP) communication standard.

The data operation requested by means of the data operation message 410 may be executed by the given data repository 140-2 where the data is stored. For example, the data may be accessed, i.e., subject to a read/write operation. A result of the data operation executed by the given data repository 140-2 is returned to the data repository 140-1—again by employing the communication protocol 111 of the data backend system 101. This result of the data operation is proxied through the data repository 140-1 to the HLR 320-1. The data operation result is translated by logic within HLR to a response message that is sent back to the initiating core network entity, e.g. the MSC-S 310. For example, the response message may comprise at least one of the following: an indicator indicating success or failure of the data operation; a value of the data requested by the data operation; an indicator indicating success or failure of the service; a value of the information requested by the request message; a service that was requested by the request message 400.

While the reference implementation has been discussed with respect to the two data repositories 140-1, 140-2 only, it should be understood that in general a larger number of data repositories may be provided in the data backend system 101. In particular, the routing path 501 may pass a plurality of data repositories which are—for sake of simplicity—not shown in FIG. 3.

In the reference implementation as discussed above, a failure condition may occur where the data backend system 101 is partly or fully unavailable. In other words: a connectivity status of the data backend system 101 may be disturbed. For example, one or more of a plurality of data repositories 140-1, 140-2 of the data backend may be disturbed and/or the communication between the data repositories 140-1, 140-2 may be disturbed.

Such a failure condition may cause limited or no access to the data stored in the data backend system 101. This may degrade the core network 350 functionality and/or the application layer 100 functionality.

Hereinafter, techniques for a resilience mode of operation of the DLA will be described. Such a resilience mode of operation of the DLA allows to adequately react to a failure condition such that a likelihood of failure of a requested data operation may be reduced. This may increase system stability of the mobile communications network 600.

In particular, various embodiments will be described hereinafter which allow for a routing of the request message 410 such that even when the data backend system 101 is partly or fully disturbed, a comparably high degree of resilience against failure of a requested data operation may be provided. Such a scenario may be referred to as resilience routing.

Moreover, various embodiments will be described hereinafter which allow for caching of the data partly or fully in the application layer 100 such that even when the data backend system 101 is partly or fully disturbed, a comparably high degree of resilience against failure of a requested data operation may be provided. Such a scenario may be referred to as resilience caching.

It may be possible to apply resilience routing, resilience caching, or a combination thereof, as will be described in the following.

In a failure condition where a connectivity status the data backend system 101 is disturbed, e.g. when the data repository 140-1 is unable to reach the data repository 140-2 via the backend communication protocol 111, upon receiving of the data operation message 410, the data repository 140-1 can retrieve routing information 420 which indicates a second HLR 320-2. The HLR 320-2 is communicating with the given data repository 140-2 where the storage location of the respective data is. The routing information 420 relates to a routing path 502 which uses the communication protocol 110 of the application layer 100. For example, the communication protocol 110 of the application layer 100 may be according to the Signaling System #7 (SS7) standard of the International Telecommunication Union (ITU) or a derivation thereof; yet various other standards may be employed. The data repository 140-1 sends the routing information 420 to the HLR 320-1 which then sends, i.e. proxies, the request message 400 to the HLR 320-2. The HLR 320-2 then creates a respective data operation message and sends the latter to the given data repository 140-2 where the data is stored to execute the data operation. For example, it is possible that the HLR 320-2 and the data repository 140-2 are co-located at the same site. Then a low likelihood of failure of the communication link between the two units 320-2, 140-2 may exist.

It may be possible to determine a connectivity status of the data backend system wherein said sending of the routing information to the HLR 320-1 is selectively executed depending on the determined connectivity status of the data backend system 101.

In such a scenario, even if the communication between the data repositories 140-1, 140-2 in the data backend system 101 fails, the data operation may be successfully executed. In such a resilience routing scenario the data operation may therefore be successfully executed even if the connectivity status of the data backend system 101 is disturbed; it is not necessary to rely on the communication protocol 111 and/or the communication links of the data backend system 101.

In a further embodiment, the HLR 320-1 may send a request 430 for routing information to the data repository 140-1—alternatively or additionally to the data operation message 410. For example, if a respective failure condition indication that the connectivity status of data backend system 101 is disturbed is already available to the HLR 320-1, it may be unnecessary to create and send the data operation message 410 by the HLR 320-1. Rather, it may be sufficient to merely send the request 430 for the routing information to the data repository 140-1. The data repository 140-1 then returns the routing information 420 as described above. In other words: if the HLR 320-1 is already informed that the data backend system 101 is operating in resilience mode, it may be expendable to send the data operation message 410 to the data repository 140-1. It may also be possible that the HLR 320-1 retrieves the routing information 420, e.g. autonomously and/or independently, from a respective storage location database of the data backend system 101. This may be possible if the HLR 320-1 communicates directly with the respective storage location database and/or stores a cached copy of the respective storage location database; in such a case it may be expendable to involve the data repository 140-1 in said retrieving of the routing information 420.

In yet further embodiments a cached copy of the data is stored on the HLR 320-2. When the HLR 320-2 receives the request message 400 from the HLR 320-1, the HLR 320-2 executes the data operation on the cached copy of the data stored thereon, in dependence on the received request message 400. By such means it may be possible to execute the data operation even if the given data repository 140-2 of the data backend system 101, on which the storage location on the data is normally located, is unavailable. When the connectivity status of the data backend system 101 changes from the disturbed status to an undisturbed status, the data stored on the data repository 140-2 can be updated based on a cached copy of the data on the HLR 320-2. This allows returning the system to normal operation.

Therefore, in more general terms, when a determining indicates the connectivity status of the data backend system 101 changing from a disturbed status to an undisturbed status, it may be possible to update the at least one slave copy of the data based on the master copy of the data stored on the given data repository 140-2.

It may be possible to automatically and/or manually trigger operation of the data backend system 101 in resilience mode. For this, monitoring of the connectivity status of the data backend system 101 may be performed, e.g. on at least some of the data repositories of the data backend system 101.

As can be seen, different degrees of resilience against failure conditions may be achieved by migrating certain functionalities such as message routing and/or data storage from the data backend system 101 to the application layer 100. Below further details of such techniques will be discussed.

Figure 4A:
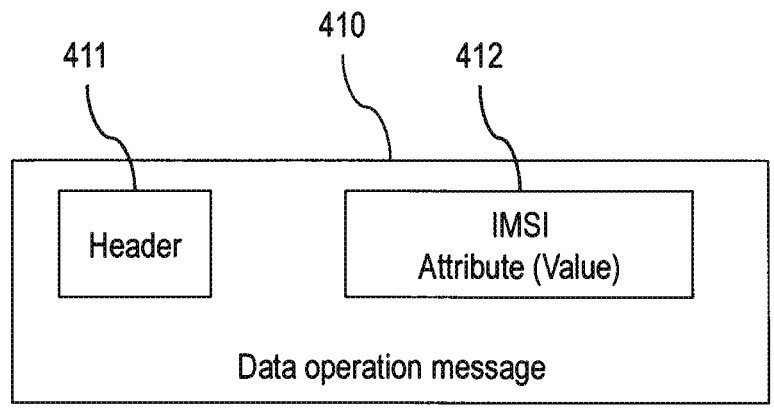
FIG. 4A schematically shows a data operation message for an operation on data stored in the data backend system.

In FIG. 4A the data operation message 410 is schematically illustrated. The data operation message 410 comprises a header 411 and payload 412. For example, the payload 412 can contain the IMSI of the subscriber of the UE 300 and an attribute and value pair relating to a write operation of the respective subscriber data.

As mentioned above, the data operation message 410 can be formatted according to the LDAP protocol. Yet, in general the data operation message 410 may be formatted according to any standard or protocol. It may be possible that the data operation message 410 is included in other messages or is sent to the data backend system 101 in an implicit format.

Figure 4B:
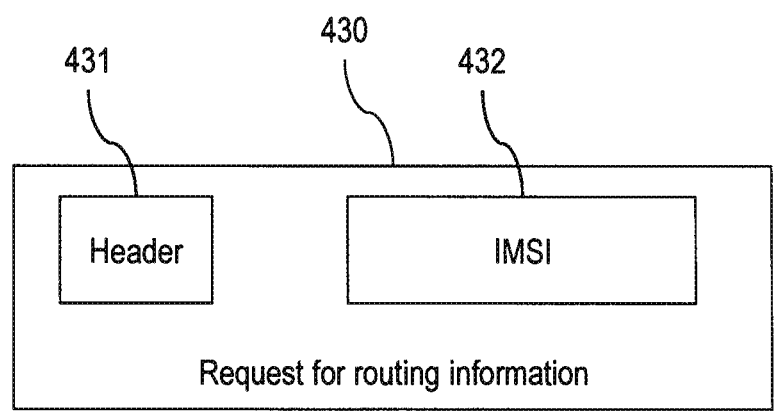
FIG. 4B schematically shows a request for routing information created by an application front end entity.

In FIG. 4B, the request 430 for routing information is depicted. Also the request 430 for routing information comprises the header 431 and a payload section 432. The payload section includes the IMSI. In contrast to the data operation message 410 discussed above with respect to FIG. 4A, the request 430 for routing information does not need to contain an explicit specification of the requested data operation on the data, e.g. does not need to contain a particular parameter-value pair specifying a parameter of the data to be overwritten or read. It may be possible that the request 430 for routing information is included in other messages or is sent to the data backend system 101 in an implicit format.

Figure 5:
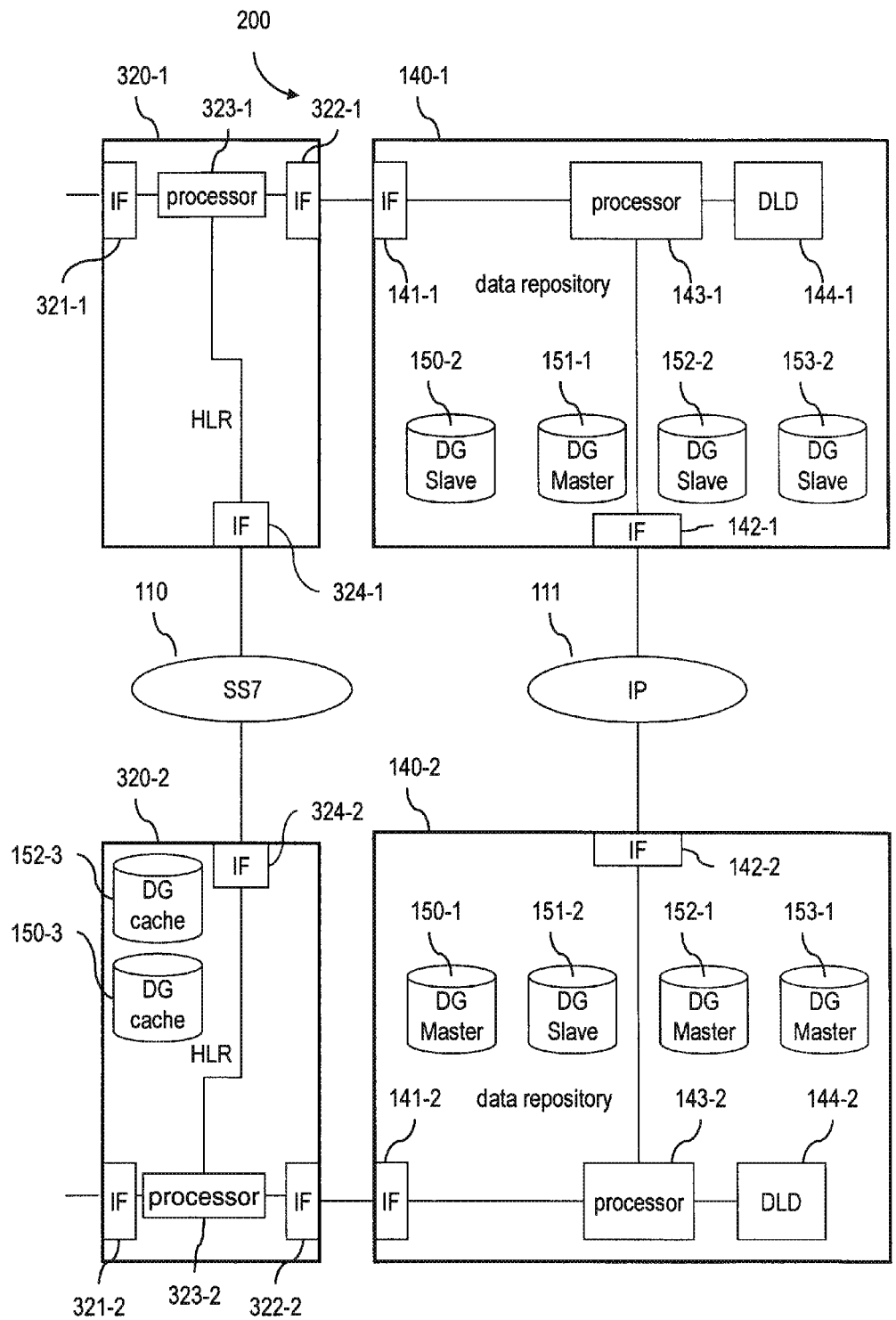
FIG. 5 shows the scenario of FIG. 3 in greater detail, according to various embodiments.

Next, turning to FIG. 5, a more detailed view of the scenario of FIG. 3 is depicted. As can be seen, the HLR 320-1 comprises a processor 323-1 and three interfaces 321-1, 322-1, 324-1 (labeled IF in FIG. 5) which are configured to communicate with the core network 350, the data repository 140-1, and the HLR 320-2 respectively. Likewise, the HLR 320-2 comprises a processor 323-2 and three interfaces 321-2, 322-2, 324-2.

As can be seen from FIG. 5, the data repository 140-1 comprises an interface 141-1 which is configured to communicate with the interface 322-1 of the HLR 320-1. Likewise, the data repository 140-2 comprises an interface 141-2 which is configured to communicate with the interface 322-2 of the HLR 320-2. Furthermore, the data repository 140-1 comprises a processor 143-1 which can access a storage location database or data location directory (DLD) 144-1. The DLD 144-1 may be physically stored on a memory of the data repository 140-1. Likewise, the data repository 140-2 comprises a processor 143-2 which can access a DLD 144-2 of the data repository 140-2 The DLDs 144-1, 144-2 include metadata used for the operation and maintenance of the data backend system. For example, a storage location of the data may be stored in at least one of the DLDs 144-1, 144-2.

It is possible that the data is redundantly stored on the plurality of data repositories of the data backend system 101. For example a master copy of the data may be stored on the data repository 140-2. At least one slave copy of the data may be stored on further data repositories, e.g., the data repository 140-1.

For example, data belonging to different subscribers may be grouped in so-called Data Groups (DG). At every given point in time, a master copy of every DG may be stored on a given data repository and one or more slave copies of the DG may be stored on various further data repositories. A data loss likelihood may be reduced.

In FIG. 5, four master copies of DGs 150-1, 151-1, 152-1, 153-1 are stored on the data repositories 140-1, 140-2, respectively. Each one of the master copies of the DGs 150-1, 151-1, 152-1, 153-1 has a corresponding slave copy of the respective DG 150-2, 151-2, 152-2, 153-2. Master and slave copies of the various DGs are stored on different data repositories 140-1, 140-2, respectively.

Furthermore, a cached copy of the DGs 150-3, 152-3 is stored on the HLR 320-2. For example, the cached copy 150-3, 152-3 may be created from the master copy of the respective DG 150-1, 152-1. There may be functionalities implemented for the DLA which enable to update the various copies of the data such that duplicates and data inconsistencies are prevented and such that data errors are avoided.

In particular, it may be possible to recurrently update the cached copy of the DGs 150-3, 152-3 when the system is operating in normal mode, i.e., when there is no disturbance of the connectivity status at the data backend system 101. Once it is determined that the connectivity status of the data backend system 101 is disturbed, e.g. based on monitoring, data operations may be executed on the cached copies of the DGs 150-3, 152-3 stored on the HLR 320-2.

Alternatively or additionally it is possible that—given the respective data repository 140-2 can be accessed—the data operation is executed on the master copy of the respective DG 150-1, 152-1. Alternatively or additionally it is possible to protect the slave copies of the respective DGs 150-2, 152-2 against data operation. By latter feature it may be possible to avoid data failures and inconsistencies by where a data operation is unintentionally executed on a slave copy and, e.g., later on lost due to erroneous synchronization between slave and master copies.

More generally, it may be possible that at least one slave copy of the data is stored on the data repository 140-1. It may be possible that the first data repository protects its slave copy of the data against data operation in response to receiving the request 430 for routing information.

It should be understood that the assignment of a particular DG as master copy or slave copy may be flexible and change over the course of time. For example, it may be possible that at a first moment in time the master copy of the first DG 150-1 is located on the data repository 140-2; while at a second point in time the master copy of the DG 150-1 is stored on the data repository 140-1. In such a case, the DLD 144-1, 144-2 should be updated using respective synchronization functionalities of the data backend system 101.

In the scenarios discussed above, the routing information 420 towards the HLR 320-2 is retrieved by the data repository 140-1 accessing the DLD 144-1. This retrieving of the routing information 420 is triggered by either receiving the data operation message 410 or the request 430 for routing information.

Figure 6:
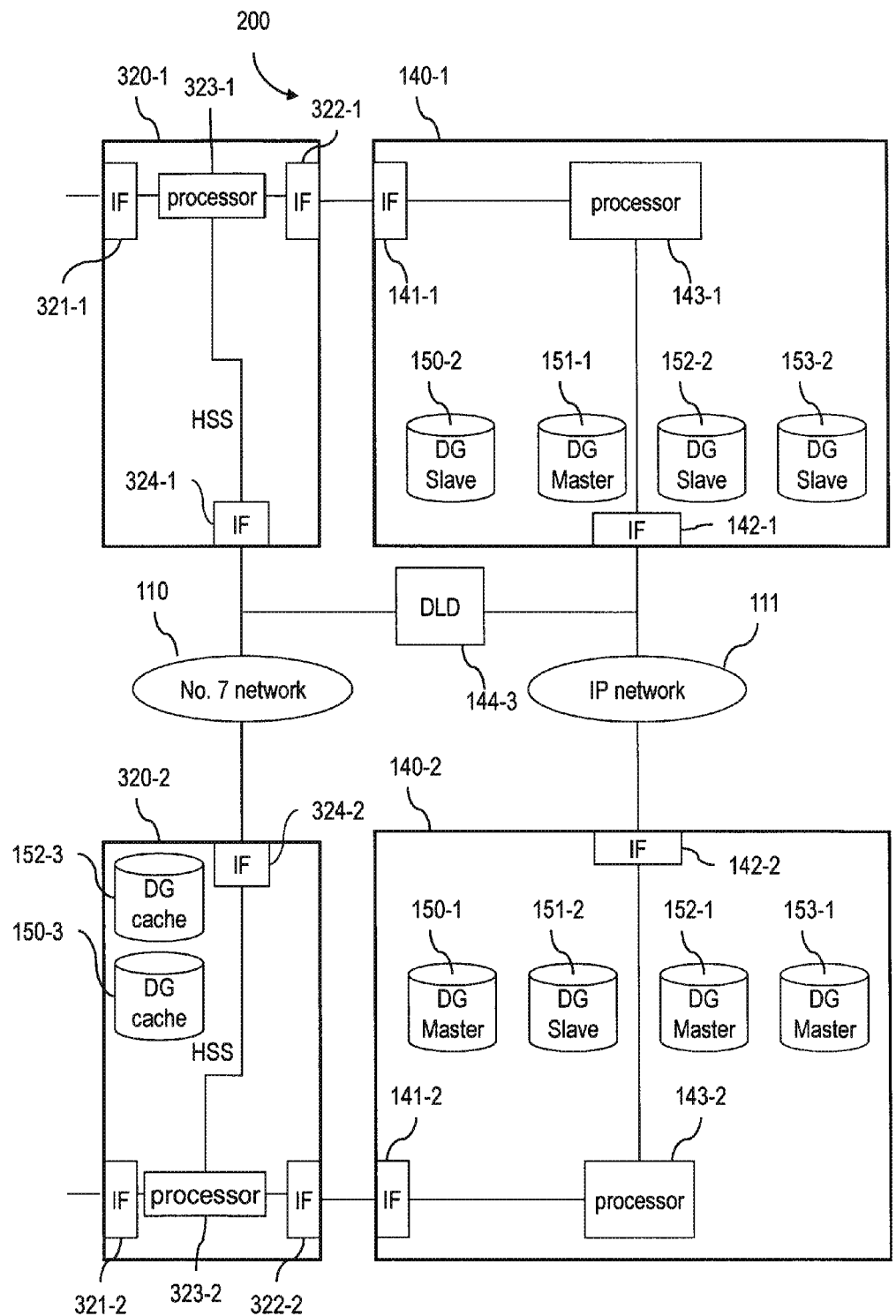
FIG. 6 shows the scenario of FIG. 3 in further detail, according to various further embodiments.

In various embodiments it is possible that the HLR 320-1 does not send the data operation message 410 and/or the request 430 for routing information to the data repository 140-1. Rather, it is possible that the HLR 320-1 retrieves the routing information 420 directly from a respective DLD 144-3 (cf. FIG. 6). This may be possible when the DLD 144-3 may be accessed directly by the application front end entities of the application layer 100. This may be the case for a scenario as depicted in FIG. 6, or for a scenario where a cached copy of the DLD 144-2 (cf. FIG. 5) is stored in the HLR 320-1. In other words: a resilience cache may not only apply to the data, e.g. subscriber data, stored by the data backend system 101. Yet, it may also apply to meta-data such as the routing information 420. It may be possible to store a cached copy of the routing information 420 in the application layer 100, e.g., on all or particular ones the application front end entities.

Figure 7:
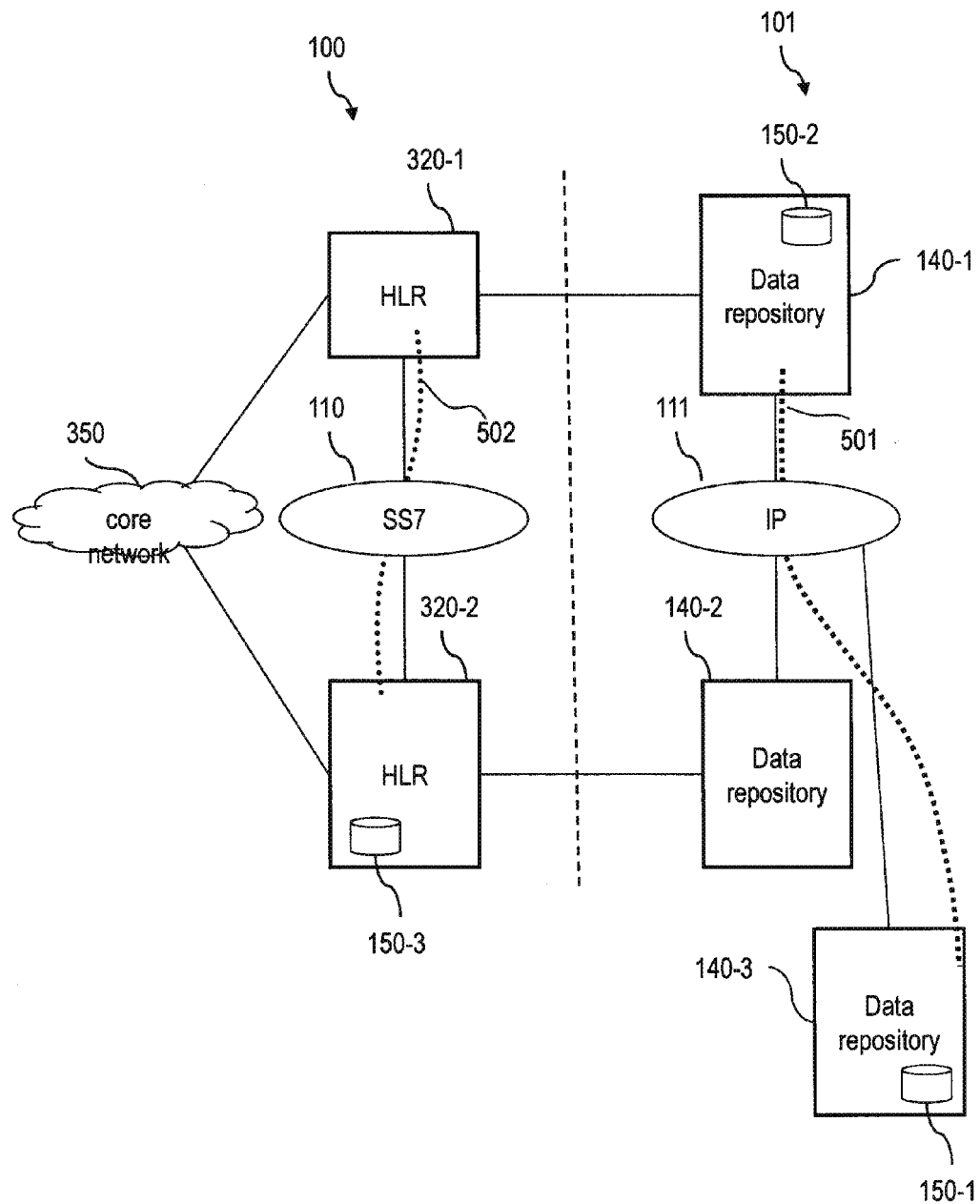
FIG. 7 is a further embodiment of the scenario of FIG. 3.

In FIG. 7, yet a further embodiment is illustrated where the master copy of the DG 150-1 is stored on a data repository 140-3. In the scenario of FIG. 7, the HLR 320-2 also stores a cached copy of this DG 150-3. The HLR 320-2 communicates with the given data repository 140-2. This data repository 140-2 may optionally store a slave copy of the DG 150-2 (not shown in FIG. 7). In other words: it is not necessary that the cached copy of the data is stored on the particular application front end entity which is communicating with the data repository of the data backend system 101 which holds the master copy of the data.

Therefore, in more general terms, a master copy of the data may be stored on the data repository 140-3. When the connectivity status of the data backend system 101 changes from a disturbed status to an undisturbed status, the master copy of the data stored on the data repository 140-2 may be updated based on the cached copy of the data stored on the second application front end entity, e.g., the HLR 320-2.

Figure 8:
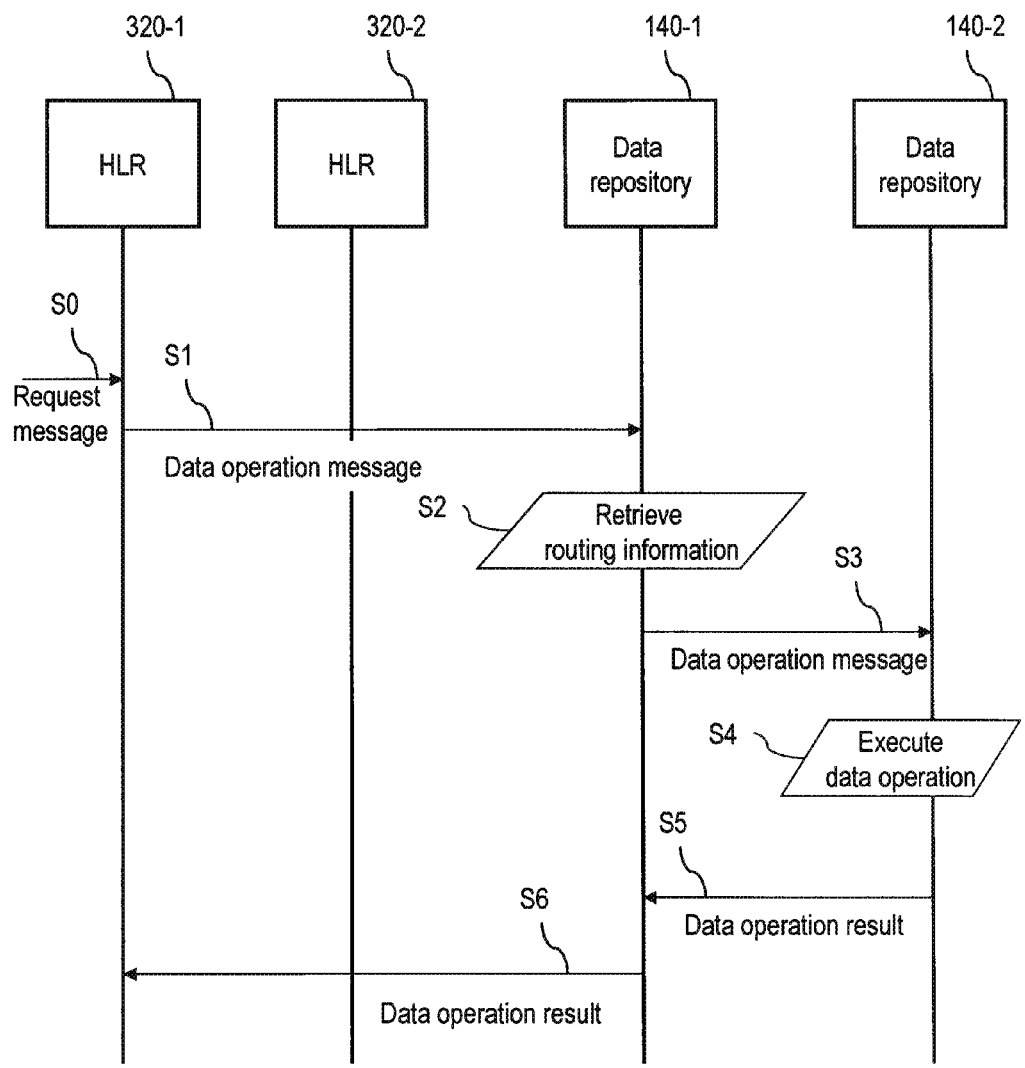
FIG. 8 is a signaling diagram of a reference implementation of an operation of a Data Layered Architecture.

In FIG. 8, a reference implementation of a method of routing the request message 400 and the data operation message 410 towards the storage location of the data in the data backend system 101, and of executing the data operation, is depicted in the form of a signaling diagram.

In step S0 the request message 400 is received by the HLR 320-1, e.g. from a core network entity such as the MSC-S 310 (cf. FIG. 2). The HLR 320-1 creates the data operation message 410 based on the received request message 400. The HLR 320-1 sends the created data operation message 410 to the data repository 140-1 (step S1). Based on the received data operation message 410, the data repository 140-1 retrieves the routing information 420, e.g. from the DLD 144-1. The routing information includes an IP target address of the given data repository 140-2 where the storage location of the data is. The routing information 420 allows the data repository 140-1 to proxy the data operation message 410 towards the given data repository 140-2 where the storage location of the data is (step S3). For example, the data repository 140-2 can hold the master copy of the data. Then the data operation can be executed on the master copy of the data (step S4) and the data operation result can be returned to the HLR 320-1 via the data repository 140-1 (steps S5 and S6).

For example, the connectivity status of the data backend system 101 may be monitored, i.e. recurrently checked. If said monitoring indicates an undisturbed connectivity status of the data backend system 101, the data repository 140-1 may operate according to a normal mode of operation. The normal mode of operation can correspond to the scenario as discussed above with respect to FIG. 3, i.e. where the data repository 140-2 is accessed employing communication means of the data backend system 101. This may in particular be the case if the routing information 420 indicates the routing path 501 employing the communication protocol 111 of the data backend system 101.

For example, if said monitoring indicates a disturbed connectivity status of the data backend system 101, the DLA, in particular the data repository 140-1, may operate according to a resilience mode of operation. In this resilience mode of operation, resilient routing and/or resilience caching may be enabled.

Figure 9:
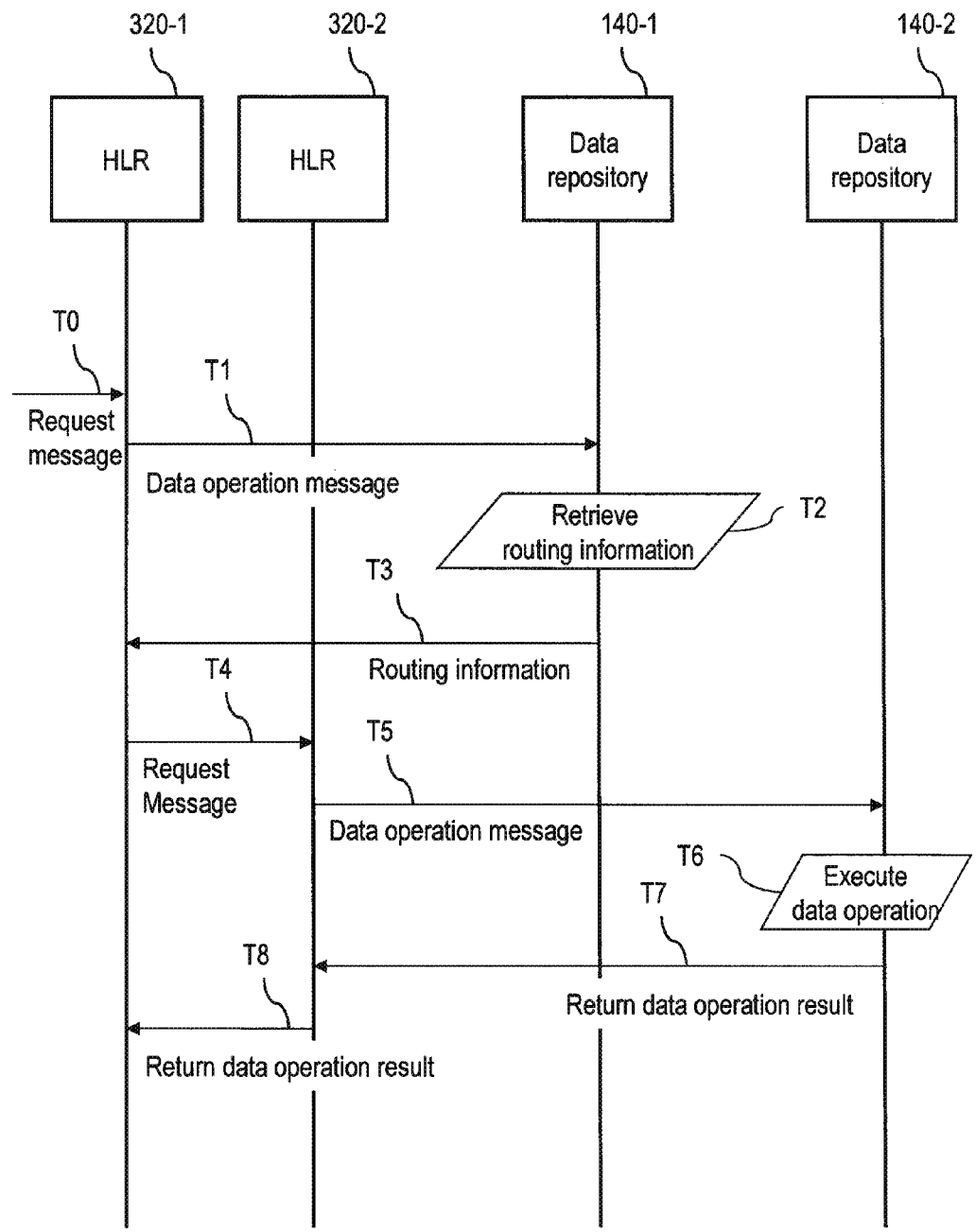
FIG. 9 is a signaling diagram of methods of routing a request message and executing a data operation in a Data Layered Architecture.

For example, the routing path 502 can be determined such that it employs the communication protocol 110 of the application layer 100. Such a scenario is discussed with respect to FIG. 9. In FIG. 9, the steps T0 and T1 correspond to the steps S0 and S1 of FIG. 8.

In step T2 the routing information 420 is retrieved by the data repository 140-1, for example again from the DLD 144-1. The routing information 420 is returned to the HLR 320-1 in step T3. In particular, the routing information 420 as retrieved in step T2 enables the HLR 320-1 to send the request message 400 to the HLR 320-2 (step T4). In other words, the routing information 420 indicates the routing path 502 which employs the communication protocol 110 of the application layer 100 (cf. FIG. 3).

It should be understood that instead of sending the data operation message 410 in step T1 to the data repository 140-1, it is also possible that the HLR 320-1 sends the request 430 for routing information to the data repository 140-1 (cf. FIG. 4B).

Once the request message 400 has been proxied to the HLR 320-2 by the HLR 320-1 in step T4, in step T5 the HLR 320-2 creates the data operation message 410 and sends the latter to the given data repository 140-2 where the storage location of the data is. For example, the data repository 140-2 holds the master copy of the respective data and can execute the data operation thereon (step T6). Afterwards, the data operation result is translated to a response message by HLR 320-2 and sent to origin of the request message 400 in the core network 350. For example, as illustrated in the scenario of FIG. 9, the data operation result may be returned to the HLR 320-1 employing the communication protocol 110 of the application layer 100 (steps T7 and T8), e.g., by using the same routing path 502 as has been previously used for said routing of the request message 400 in step T4. In other scenarios it may be possible that the HLR 320-2 directly returns the response message to the origin of the request message 400 in the core network. This may be possible, because the HLR 320-2 may communicate directly with the core network 350 (cf. FIG. 3). In latter scenario it may be expendable to communicate via the communication protocol 110 of the application layer 100. Therefore, step T8 of FIG. 9 is an optional step.

As can be seen from a comparison of the FIGS. 8 and 9, functionality regarding the routing of the request message 400 and the data operation message 410, respectively has been migrated from the data backend system 101 to the application layer 100. Resilience routing is employed. This typically provides for a larger resilience against a failure condition of the data backend system 101.

Figure 10:
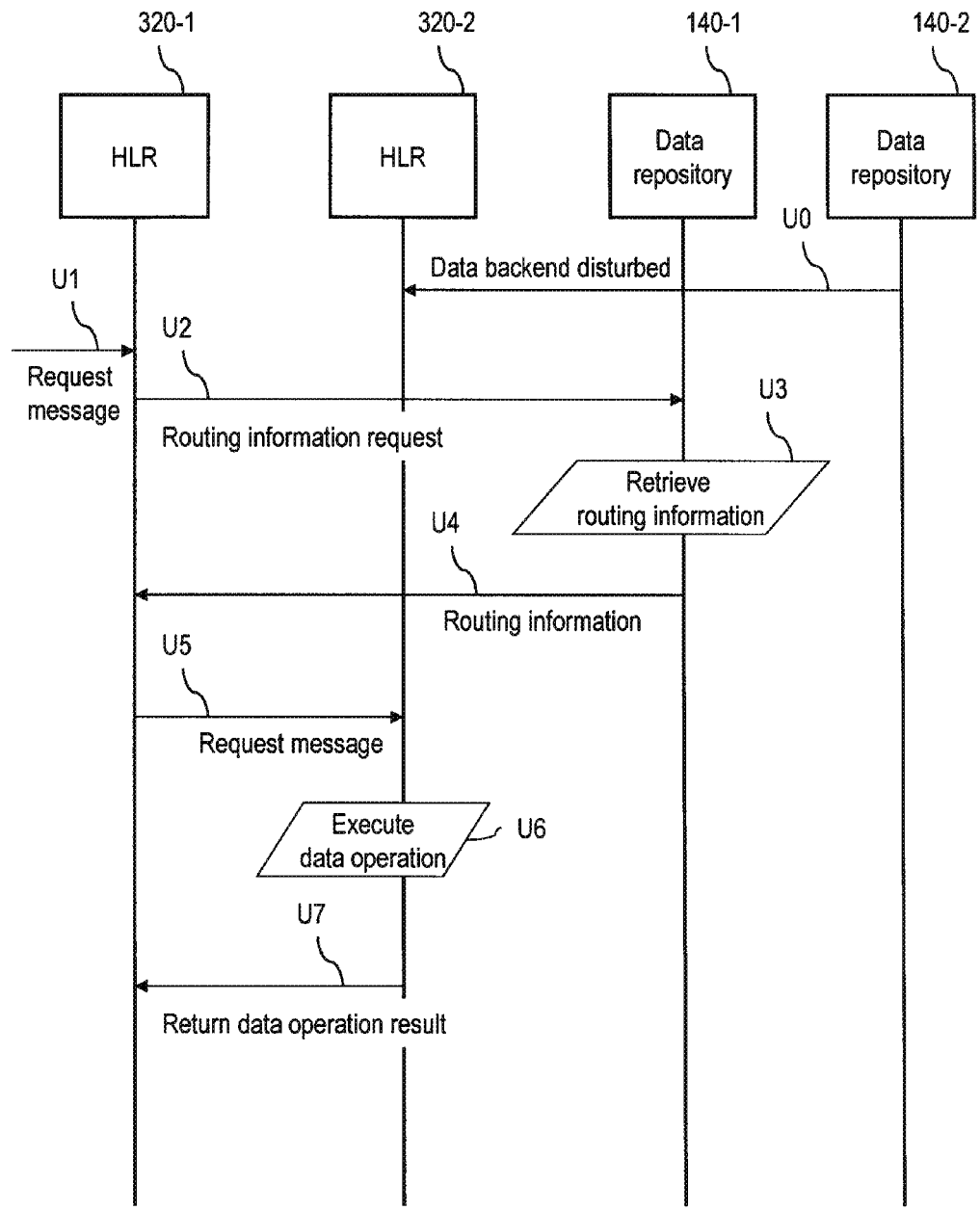
FIG. 10 is a signaling diagram of methods of routing a request message and executing a data operation in a Data Layered Architecture, where a cached copy of the data is stored on an application front end entity of the application layer.

Turning to FIG. 10, a further scenario allowing for a high likelihood of successful execution of the data operation—even when the data backend system 101 is at least partially disturbed—is depicted. At step U0, the data repository 140-2 informs the HLR 320-2 with which it is communicating that the data backend system 101 is disturbed. Alternatively or additionally, the data repository 140-1 can inform the HLR 320-1 with which it is communicating that the backend is disturbed (not shown in FIG. 10). Such information may be sent using a dedicated explicit or implicit message.

At some later point in time, the request message 400 is received by the HLR 320-1 in step U1. The request 430 for the routing information is sent to the data repository 140-1 (step U2) which in turn retrieves the routing information 420 (step U3) and sends the routing information 420 to the HLR 320-1 (step U4). This enables the HLR 320-1 to send the request message 400 to the HLR 320-2 in step U5, again employing the communication protocol 110 of the application layer 100. In step U6, the HLR 320-2 executes the requested data operation on a cached copy of the data stored on the HLR 320-2. This is because the HLR 320-2 has been informed in step U0 that the data backend system 101 is disturbed. It therefore does not attempt to send the data operation message 410 created based on the request message 400 to the data repository 140-2.

The data operation result is translated to a response message by HLR 320-2 and sent to origin of the request message. This may be achieved by sending the data operation result to the HLR 320-1; however, step U7 is optional. The response message may be sent directly to the origin of the request message 400 in the core network 350 by the HLR 320-2, i.e., without involving the HLR 320-1.

Once the failure condition of the data backend system 101 resolves, the respective data stored in the data backend system 101 can be updated based on the cached copy on the HLR 320-2 (not shown in FIG. 10).

As can be seen from a comparison of the FIGS. 8 and 10, functionality relating to the storage of data has been migrated from the data backend system 101 to the application layer. This allows for a higher likelihood of a successful execution of the requested data operation under failure conditions of the data backend system 101.

Figure 11:
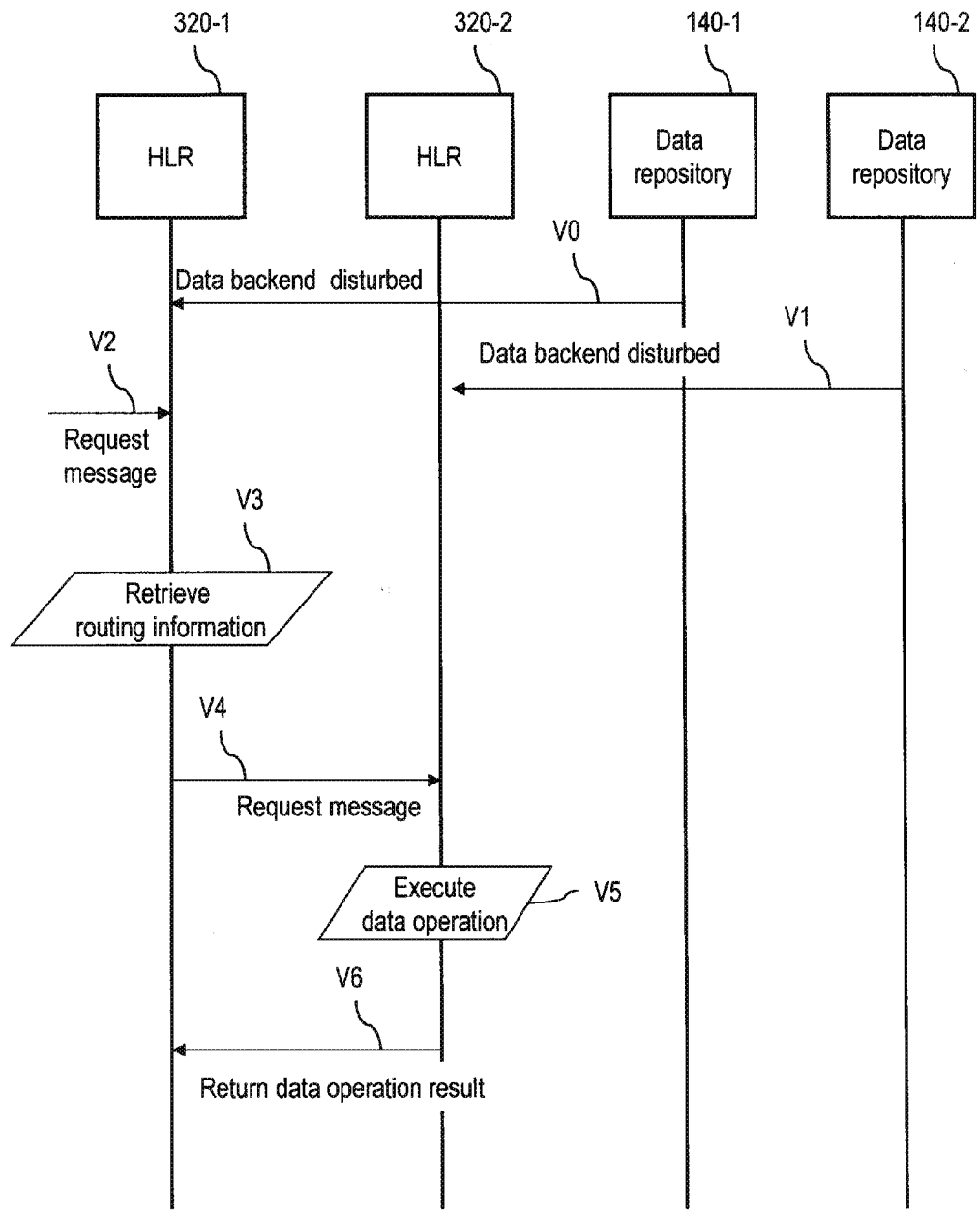
FIG. 11 is a signaling diagram of methods of routing a request message and executing a data operation according to FIG. 10, where furthermore an application front end entity directly retrieves the routing information for said routing of the request message.

Turning to FIG. 11, yet a further scenario is illustrated which allows to execute the data operation in an at least partially disturbed state of the data backend system 101. In steps V0 and V1, the data repositories 140-1, 140-2 inform the HLRs 320-1, 320-2 that the data backend system 101 is disturbed.

At some later point in time, the request message 400 is received by the HLR 320-1 (step V2). In step V3, the HLR 320-1 retrieves the routing information 420 directly from a storage location database. For example, in step V3 the HLR 320-1 can retrieve the routing information 420 from a cached copy of the DLD 144-2 stored on the HLR 320-1. It is also possible that the HLR 320-1 can directly access the DLD 144-3 of the data backend system 101 (cf. FIG. 6). Once the routing information 420 is retrieved in step V3, the request message 400 is proxied to the HLR 320-2 (step V4). In step V5, the data operation is executed; in the scenario of FIG. 11 this is done on the cached copy stored on the HLR 320-2. The data operation result is translated to a response message by HLR 320-2 and sent to origin of the request message. This may occur in step V6 by sending the data operation result to the HLR 320-1. Step V6 is optional. It is also possible that the HLR 320-2 directly reports the data operation result to the origin of the request message 400 in the core network 350. Therefore, the steps V4, V5, V6 of FIG. 11 correspond to the steps U5, U6, U7 of FIG. 10.

From a comparison of the FIGS. 9, 10 and 11 as discussed above it can be seen that in various scenarios more or less functionality can be shifted or migrated from the data backend system 101 to the application layer 100. For example, in the scenario discussed with respect to FIG. 9, both the routing information 420 as well as the storage location of the data on which the data operation is executed reside in the data backend system 101. In the scenario discussed with respect to FIG. 10, the storage location on which the data operation is executed is migrated from the data backend system 101 to the application layer 100. Lastly, as discussed with respect to FIG. 11, it is also possible to retrieve the routing information 420 without accessing the data backend system 101. Various combinations of the scenarios as discussed above are possible.

If a certain amount of functionality is migrated from the data backend system 101 to the application layer 100 in case of a failure condition, an accordingly larger degree of resilience against disturbance of the connectivity status of the data backend system 101 may be achieved—at the same time it may be necessary to provide a larger amount of data, e.g. routing information 420 and/or cached data 150-3, in the application layer 100.

Figure 12:
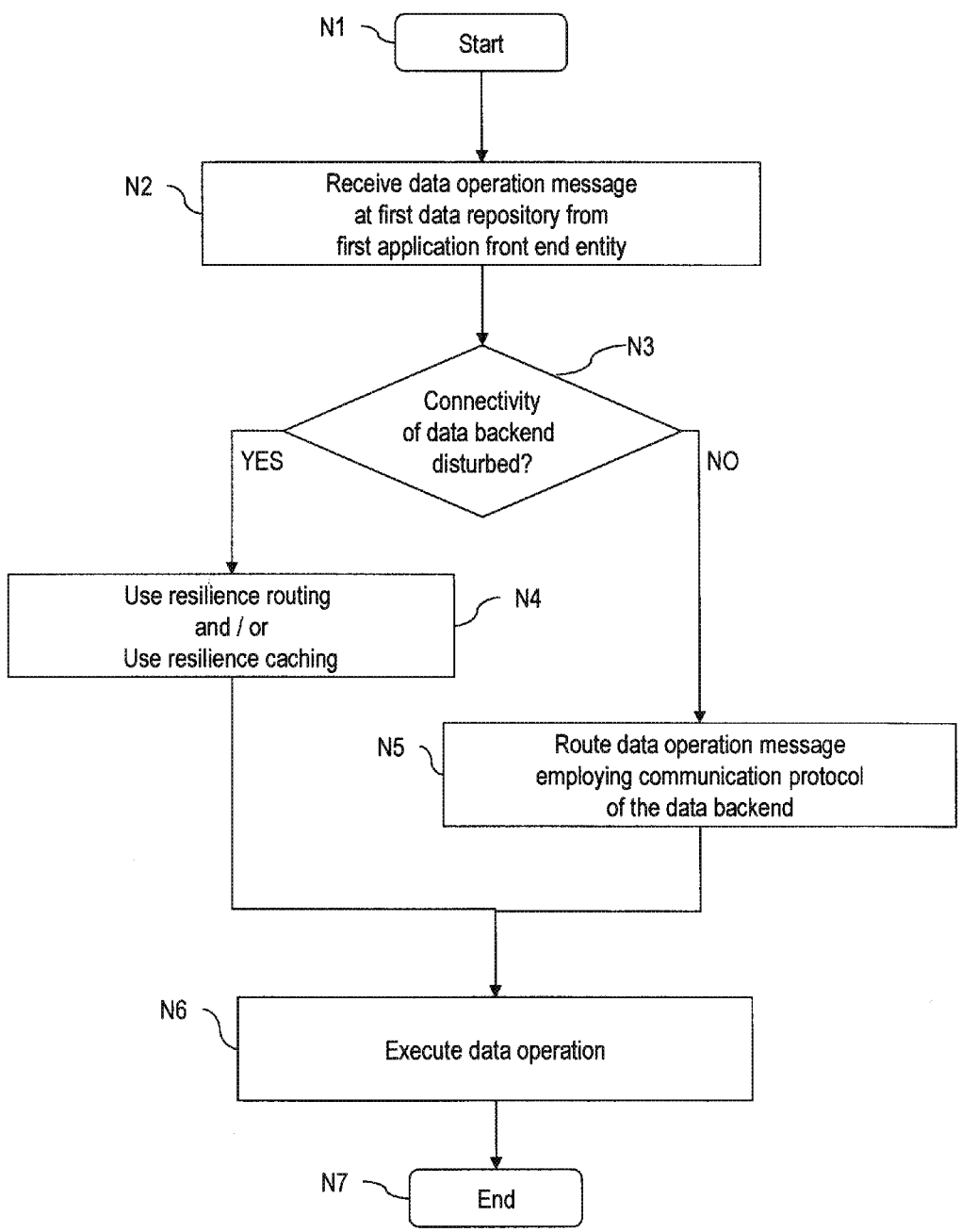
FIG. 12 is a flowchart of a method of routing a request message requesting data operation of data stored in the data backend system.

In FIG. 12 a flowchart according to techniques of various embodiments is depicted. The method starts in step N1. In step N2, the data operation message 410 is received by the data repository 140-1. In step N3 it is checked whether the connectivity status of the data backend system 101 is disturbed. Step N3 may include monitoring the connecting status, e.g. by recurrently checking the functioning of the data backend system 101. Alternatively or additionally, step N3 may include receiving an indicator of a failure condition of the data backend system 101. For example, step N3 can be executed by the processor 143-1 of the data repository 140-1 or can be executed by different units forming part of the data backend system 101. If in step N3 it is determined that the connectivity status is undisturbed, the method commences with step N5. In step N5, the data operation message 410 is routed employing the communication protocol 111 of the data backend system 101.

However, if in step N3 it is determined that the connectivity status of the data backend system 101 is disturbed, the method commences with step N4. In step N4, resilience routing and/or resilience caching is used.

Figure 13:
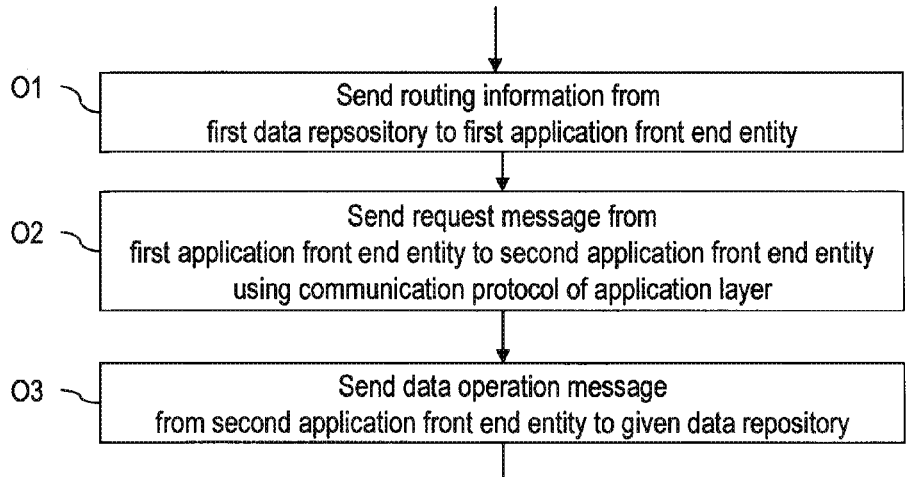
FIG. 13 is a flowchart illustrating further details of the flowchart of FIG. 12.

Details of the resilience routing of step N4 are depicted in the flowchart of FIG. 13. In step O1, the routing information 420 is sent from the data repository 140-1 to the HLR 320-1. The HLR 320-1 is enabled, based on the routing information 420, to send the request message 400 to the HLR 320-2, employing the communication protocol 110 of the application layer 100 (step O2).

In step O3, the HLR 320-2 creates the data operation message 410 based on the received request message 400. The HLR 320-2 sends the data operation message 410 to the data repository 140-2. The data repository 140-2 executes the data operation on the master copy of the data.

Figure 14:
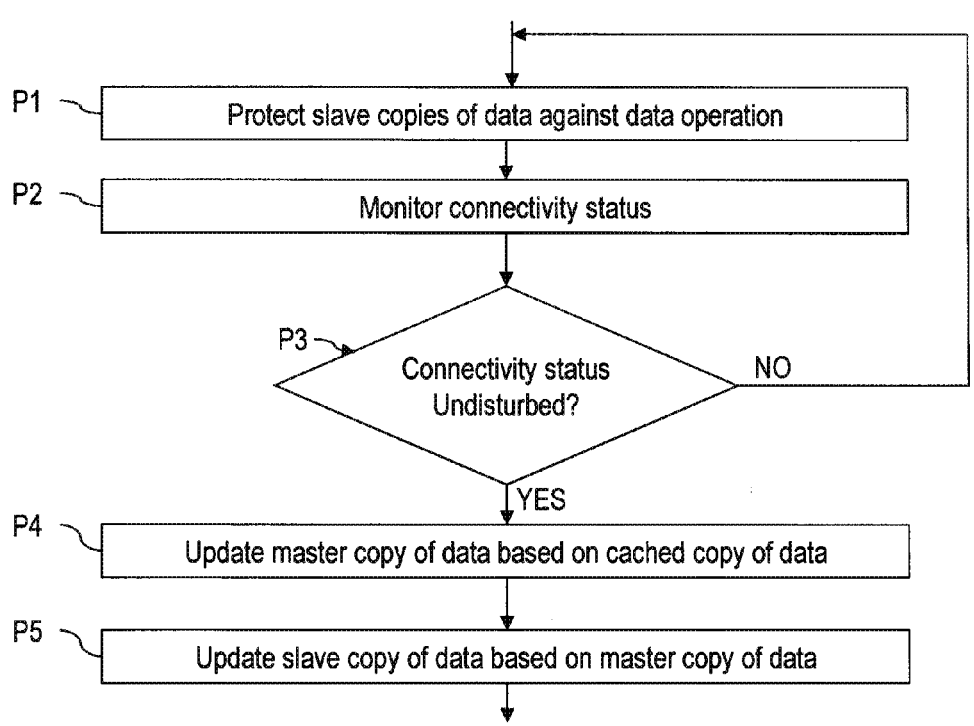
FIG. 14 is a flowchart illustrating further details of the flowchart of FIG. 12.

In FIG. 14, further details of step N4 of FIG. 12 with respect to resilience caching are depicted.

For example, when the connectivity status of the data backend system 101 is disturbed, the slave copies of the data stored in the data backend system 101 can be protected against data operation (step P1).

In step P2, the connectivity status of the data backend system 101 can be recurrently checked. If it is determined that the connectivity status changes from a disturbed status to an undisturbed status in step P3, the steps P4 and P5 can be executed. Otherwise, steps P1 and P2 can be executed anew.

In step P4 the master copy of the data stored in the data backend system 101 is updated based on a cached copy of the data stored on an application front end entity of the application layer.

Then, in step P5, the slave copies of the data stored in the data backend system 101 are updated based on the master copy of the data. It should be understood that step P4 is an optional step, depending whether there is a cached copy stored in one of the application front end entities of the application layer.

As can be seen from the above, techniques have been described which enable an extra level of resilience to a DLA. This is achieved by providing resilient routing which employs a routing path using the communication protocol of the application layer and/or resilience caching enabling for caching of data and/or meta-data in the application layer. Such techniques allow a DLA to function, at least partially, during extreme failure affecting the data backend connectivity and to litigate data inconsistencies that would occur in various reference implementations.

In further detail, when a request message requesting data operation on data is received by the DLA, in a normal mode of operation such a data operation request will be processed by the data backend system; the data backend system may route the data operation request and may execute the data operation request, e.g. independently from the application layer. In a resilience mode of operation, routing information is retrieved by a first front end entity of the application layer which receives the request message; this enables the first application front end entity to route the data operation request message to a second application front end entity of the application layer. The second application front end entity communicates with one or more data repositories which store the data in the resilience mode of operation of the DLA. Alternatively or additionally is also possible to provide a cached copy of the data on the second application front end entity and to execute the data operation on this cached copy.

While specific embodiments of the invention are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The invention claimed is:

1. A method of providing routing information for routing of a request message in a communication network,
   wherein the request message requests a service requiring a data operation on data,
   wherein the data is stored on a plurality of data repositories configured for communicating via a communication protocol, thereby constituting a data backend system of the communication network,
   wherein a plurality of application front end entities of an application layer of the communication network can access the data backend system,
   wherein each one of the plurality of application front end entities is configured for communicating with a respective given data repository,
   wherein the method comprises:
   a first data repository of the plurality of data repositories receiving, from a first application front end entity of the application layer, a request for routing information for the request message towards a storage location of the data or receiving a data operation message created by the first application front end entity based on the request message,
   in response to said receiving of the request for routing information or of the data operation message, retrieving routing information towards a second application front end entity of the application layer which communicates with a given data repository,
   wherein the storage location of the data is at least on the given data repository,
   the first data repository sending the routing information to the first application front end entity with the routing information being such that the first application front end entity is enabled to route the request message to the second application front end entity using a communication protocol of the application layer.

2. The method of claim 1,
   wherein the data is stored redundantly on the plurality of data repositories:
   as a master copy of the data on the given data repository communicating with the second application front end entity, and
   as at least one slave copy of the data,
   the method further comprising:
   determining a connectivity status of the data backend system,
   wherein said sending of the routing information to the first application front end entity is selectively executed depending on the determined connectivity status of the data backend system.

3. The method of claim 2,
   wherein one of the at least one slave copy of the data is stored on the first data repository,
   wherein the method further comprises:
   in response to said receiving of the request for routing information or of the data operation message, the first data repository protecting its slave copy of the data against data operation.

4. The method of claim 2, wherein the method further comprises:
   when said determining indicates the connectivity status of the data backend system changing from a disturbed status to an undisturbed status, updating the at least one slave copy of the data based on the master copy of the data on the given data repository.

5. The method of claim 1,
   wherein a cached copy of the data is stored on the second application front end entity,
   wherein the method further comprises:
   the second application front end entity receiving, from the first application front end entity, the request message,
   in dependence on the received request message, the second application front end entity executing the data operation on the cached copy of the data.

6. The method of claim 5,
   wherein a master copy of the data is stored on a second data repository,
   wherein, when a connectivity status of the data backend system changes from a disturbed status to an undisturbed status, the master copy of the data stored on the second data repository is updated based on the cached copy of the data of the second application front end entity.

7. A data repository of a plurality of data repositories that are configured for communicating via a communication protocol, thereby constituting a data backend system of a communication network,
   wherein a plurality of application front end entities of an application layer of the communication network can access the data backend system,
   wherein each one of the plurality of application front end entities is configured for communicating with a respective given data repository,
   the data repository comprising:
   a first interface which is configured for receiving, from a first application front end entity of the application layer, a request for routing information for a request message towards a storage location of data or a data operation message being created by the first application front end entity based on the request message,
   wherein the request message requests a service requiring a data operation on the data, a processor which is configured for retrieving, in response to said receiving of the request for routing information or of the data operation message, routing information towards a second application front end entity of the application layer which communicates with a given data repository, wherein the storage location of the data is at least on the given data repository, wherein the first interface is further configured for sending the routing information to the first application front end entity with the routing information being such that the first application front end entity is enabled to route the request message to the second application front end entity using a communication protocol of the application layer.

8. The data repository of claim 7, wherein the data repository is further configured for executing a method comprising:

a first data repository of the plurality of data repositories receiving, from a first application front end entity of the application layer, a request for routing information for the request message towards a storage location of the data or receiving a data operation message created by the first application front end entity based on the request message, in response to said receiving of the request for routing information or of the data operation message, retrieving routing information towards a second application front end entity of the application layer which communicates with a given data repository, wherein the storage location of the data is at least on the given data repository, the first data repository sending the routing information to the first application front end entity with the routing information being such that the first application front end entity is enabled to route the request message to the second application front end entity using a communication protocol of the application layer.

9. A method of routing a request message in a communication network, wherein the request message requests a service requiring a data operation on data, wherein the data is stored on a plurality of data repositories configured for communicating via a communication protocol thereby constituting a data backend system of the communication network, wherein a plurality of application front end entities of an application layer of the communication network can access the data backend system, wherein each one of the plurality of application front end entities is configured for communicating with a respective given data repository, wherein the method comprises:

a first application front end entity of the application layer receiving the request message, in response to said receiving of the request message, the first application front end entity retrieving, from a storage location database of the data backend system, routing information towards a second application front end entity of the application layer which communicates with a given data repository, wherein a storage location of the data is at least on the given data repository, the first application front end entity routing the request message to the second application front end entity based on the routing information and using a communication protocol of the application layer.

10. The method of claim 9, wherein said retrieving of the routing information includes at least one of the following:

communicating with a first data repository of the data backend system which is configured for retrieving the routing information from the storage location database;

communicating with the storage location database directly;

retrieving the routing information from a cached copy of the storage location database;

sending a request for routing information to the first data repository.

11. An application front end entity of a plurality of application front end entities of an application layer of a communication network, wherein data is stored on a plurality of data repositories configured for communicating via a communication protocol, thereby constituting a data backend system of the communication network, wherein the plurality of application front end entities can access the data backend system, wherein each one of the plurality of application front end entities is configured for communicating with a respective given data repository, wherein the application front end entity comprises:

a first interface configured for receiving a request message requesting a service requiring a data operation on the data, a second interface configured for, in response to said receiving of the request message, retrieving, from a storage location database of the data backend system, routing information towards a second application front end entity of the application layer which communicates with a given data repository, wherein a storage location of the data is at least on the given data repository, wherein the application front end entity is further configured for routing the request message to the second application front end entity based on the routing information and using a communication protocol of the application layer.

12. The application front end entity of claim 11, wherein the application front end entity is further configured for executing a method comprising:

a first application front end entity of the application layer receiving the request message, in response to said receiving of the request message, the first application front end entity retrieving, from a storage location database of the data backend system, routing information towards a second application front end entity of the application layer which communicates with a given data repository, wherein a storage location of the data is at least on the given data repository, the first application front end entity routing the request message to the second application front end entity based on the routing information and using a communication protocol of the application layer.

13. A method of executing a data operation on data in response to receiving a request message in a communication network, wherein the request message requests a service requiring the data operation, wherein the data is stored on a plurality of data repositories configured for communicating via a communication protocol, thereby constituting a data backend system of the communication network, wherein a plurality of application front end entities of an application layer of the communication network can access the data backend system, wherein each one of the plurality of application front end entities is configured for communicating with a respective given data repository, wherein the method comprises:

a second application front end entity of the application layer receiving the request message from a first application front end entity of the application layer, wherein a cached copy of the data is stored on the second application front end entity, in response to said receiving of the request message, the second application front end entity executing the data operation on the cached copy of the data.

14. An application front end entity of a plurality of application front end entities of an application layer of a communication network, wherein data is stored on a plurality of data repositories configured for communicating via a communication protocol, thereby constituting a data backend system of the communication network, wherein the plurality of application front end entities can access the data backend system, wherein each one of the plurality of application front end entities is configured for communicating with a respective given data repository, wherein the application front end entity comprises:

an interface configured for receiving a request message from a first application front end entity of the application layer, wherein the request message requests a service requiring a data operation on the data, wherein a cached copy of the data is stored on the application front end entity, a processor configured for, in response to said receiving of the request message, executing the data operation of the data on the cached copy of the data.

15. The application front end entity of claim 14, wherein the application front end entity is further configured for executing a method comprising:

a second application front end entity of the application layer receiving the request message from a first application front end entity of the application layer, wherein a cached copy of the data is stored on the second application front end entity, in response to said receiving of the request message, the second application front end entity executing the data operation on the cached copy of the data.

* * * * *